(12) United States Patent
Fullan

(10) Patent No.: US 9,365,337 B2
(45) Date of Patent: Jun. 14, 2016

(54) REUSABLE GIFT PACKAGING

(71) Applicant: Bridget Fullan, New York, NY (US)

(72) Inventor: Bridget Fullan, New York, NY (US)

(*) Notice: Subject to any disclaimer, the term of this patent is extended or adjusted under 35 U.S.C. 154(b) by 0 days.

(21) Appl. No.: 14/180,792

(22) Filed: Feb. 14, 2014

(65) Prior Publication Data
US 2015/0232245 A1 Aug. 20, 2015

(51) Int. Cl.
*B65D 65/06* (2006.01)
*B65D 5/20* (2006.01)
*B65D 5/62* (2006.01)

(52) U.S. Cl.
CPC .............. *B65D 65/06* (2013.01); *B65D 5/2042* (2013.01); *B65D 5/62* (2013.01); *Y02W 30/807* (2015.05)

(58) Field of Classification Search
CPC ...... Y10S 229/923; B65D 5/62; B65D 65/14; B65D 2313/02; B65D 5/0227; B65D 65/06; B65D 5/2042; Y02W 30/807
USPC ............................ 229/87.18, 87.19, 922, 923
See application file for complete search history.

(56) References Cited

U.S. PATENT DOCUMENTS

| | | | | | |
|---|---|---|---|---|---|
| 2,018,070 | A | * | 10/1935 | Kreider, Jr. ............... | B65D 5/62 229/116.5 |
| 3,257,068 | A | * | 6/1966 | Wright ........................ | 229/87.19 |
| 3,260,359 | A | * | 7/1966 | Willhite ......................... | 229/203 |
| 3,381,889 | A | * | 5/1968 | Laskow ....................... | 229/87.19 |
| 3,391,856 | A | * | 7/1968 | Siegler ......................... | 229/87.19 |
| 3,394,867 | A | * | 7/1968 | Gregg ............................ | 229/147 |
| 3,430,845 | A | * | 3/1969 | Hoshi et al. ................. | 229/87.04 |
| 3,443,739 | A | * | 5/1969 | Adams, Jr. ...................... | 229/117 |
| 3,445,053 | A | * | 5/1969 | Lotz ............................. | 229/118 |
| 3,451,611 | A | * | 6/1969 | Adams, Jr. ...................... | 229/100 |
| 3,459,358 | A | * | 8/1969 | Adams, Jr. ...................... | 229/190 |
| 3,460,738 | A | * | 8/1969 | Adams, Jr. et al. ........... | 229/132 |
| RE26,742 | E | * | 12/1969 | Laskow ....................... | 229/87.19 |
| 3,559,876 | A | * | 2/1971 | Conescu ..................... | 229/87.19 |
| 3,658,240 | A | * | 4/1972 | Stoll ........................... | 229/87.19 |
| 3,679,120 | A | * | 7/1972 | Rubin ....................... | 229/117.08 |
| 3,690,542 | A | * | 9/1972 | Hans ........................... | 206/459.5 |
| 3,729,126 | A | * | 4/1973 | Donahue ....................... | 229/118 |
| 3,790,064 | A | * | 2/1974 | Kramer ........................ | 229/117 |
| 3,790,069 | A | * | 2/1974 | Straccamore .............. | 229/87.19 |
| 3,829,008 | A | * | 8/1974 | Murray et al. ............. | 229/87.19 |
| 3,833,164 | A | * | 9/1974 | Dagostine ..................... | 229/118 |
| 3,851,815 | A | * | 12/1974 | Desmond et al. .......... | 229/87.18 |
| 4,005,814 | A | * | 2/1977 | Foster ........................... | 229/155 |
| 4,765,535 | A | * | 8/1988 | Michetti ........................ | 229/172 |
| 4,967,952 | A | * | 11/1990 | Roessiger .................. | 229/87.19 |
| 5,004,144 | A | * | 4/1991 | Selga ........................... | 229/87.19 |
| 5,100,051 | A | * | 3/1992 | Triglia et al. ............... | 229/87.19 |
| 5,245,815 | A | * | 9/1993 | Savage ............................ | 53/449 |
| 5,337,943 | A | * | 8/1994 | Hendren .................... | 229/87.19 |

(Continued)

*Primary Examiner* — Peter Helvey

(74) *Attorney, Agent, or Firm* — James A. Italia; Italia IP

(57) ABSTRACT

Reusable, foldable ornamental packaging for enclosing and decorating a gift. A generally rigid foldable structural member is prescored to fold into a cuboid and to hold the shape of the cuboid against slumping due to gravity. The structural member has an interior surface and an external surface each covered by thin, flexible ornamental wrapping. The wrapping may have a perimetric configuration similar to that of the structural member. The wrapping may be formed as an envelope into which the structural member is received. The packaging may include ribbons or bows or both fixed thereto. The structural member may include magnetic members which releasably engage one another to hold the packaging in the cuboid configuration.

13 Claims, 5 Drawing Sheets

(56) References Cited

U.S. PATENT DOCUMENTS

| | | | |
|---|---|---|---|
| 5,364,015 A * | 11/1994 | Hirschey | 229/116.5 |
| 5,392,983 A * | 2/1995 | Clarke-Bolling et al. | 229/87.19 |
| 5,407,125 A * | 4/1995 | Yates et al. | 229/87.19 |
| 5,456,062 A * | 10/1995 | Wechsler | 53/468 |
| 5,490,597 A * | 2/1996 | Schluger | 206/575 |
| 5,518,313 A * | 5/1996 | McAdam | 383/4 |
| 5,542,597 A * | 8/1996 | Richards | 229/116.5 |
| 5,584,429 A * | 12/1996 | Savage | 229/103.3 |
| 5,671,882 A * | 9/1997 | Cerwinski et al. | 229/87.08 |
| 5,836,508 A * | 11/1998 | Savage | 229/103.3 |
| 5,850,963 A * | 12/1998 | Chang | 229/116.5 |
| 5,904,289 A * | 5/1999 | Hagan | 229/87.19 |
| 5,971,264 A * | 10/1999 | Karahoca | 229/116.5 |
| 5,979,744 A * | 11/1999 | Brigleb | 229/87.01 |
| 6,146,018 A * | 11/2000 | Keller et al. | 383/78 |
| 6,187,403 B1 * | 2/2001 | Richardson | 428/40.1 |
| 6,220,440 B1 * | 4/2001 | Singerman | 206/575 |
| 6,305,600 B1 * | 10/2001 | Hirschey et al. | 229/164.2 |
| 6,343,734 B1 * | 2/2002 | Smith | 229/87.19 |
| 6,405,869 B1 * | 6/2002 | Whittemore et al. | 206/497 |
| 6,601,757 B2 * | 8/2003 | Bowman | 229/116.5 |
| 6,604,674 B1 * | 8/2003 | Bowman | 229/116.5 |
| 6,886,309 B2 * | 5/2005 | Phillips | 53/411 |
| 7,000,771 B2 * | 2/2006 | Kwong | 206/575 |
| 7,077,308 B2 * | 7/2006 | Beach | 229/87.19 |
| 7,334,686 B2 * | 2/2008 | Filardi | 206/766 |
| 7,819,249 B2 * | 10/2010 | Han | 206/424 |
| 7,882,999 B2 * | 2/2011 | Canning | 229/116.5 |
| 7,926,702 B2 * | 4/2011 | Childs | 229/87.19 |
| 8,033,040 B2 * | 10/2011 | Flynn | 40/312 |
| 8,209,893 B2 * | 7/2012 | Flynn | 40/312 |
| 8,387,346 B1 * | 3/2013 | Coates | 53/415 |
| 2002/0179698 A1 * | 12/2002 | Temkin | 229/87.19 |
| 2003/0038168 A1 * | 2/2003 | Phillips | 229/87.19 |
| 2004/0026488 A1 * | 2/2004 | Beach | 229/87.19 |
| 2006/0022022 A1 * | 2/2006 | Bowman | 229/116.5 |
| 2006/0060642 A1 * | 3/2006 | Rosier | 229/87.19 |
| 2007/0041670 A1 * | 2/2007 | Spizman et al. | 383/118 |
| 2008/0121556 A1 * | 5/2008 | Priestley | 206/575 |
| 2009/0114707 A1 * | 5/2009 | Navarre | 229/116.5 |
| 2010/0064634 A1 * | 3/2010 | Hughes et al. | 53/399 |
| 2010/0127052 A1 * | 5/2010 | Uyehara | 229/87.19 |
| 2010/0127053 A1 * | 5/2010 | Johnson | 229/87.19 |
| 2010/0127055 A1 * | 5/2010 | Zelina et al. | 229/116.5 |
| 2011/0186620 A1 * | 8/2011 | Honkawa | 229/116.5 |
| 2012/0012646 A1 * | 1/2012 | Bissonnette | 229/87.19 |
| 2013/0186947 A1 * | 7/2013 | Hohman | 229/87.19 |

* cited by examiner

REUSABLE GIFT PACKAGING

FIELD OF THE INVENTION

The present invention relates to ornamental packaging, such as for gift wrapping, and more particularly to reusable, reinforced gift packaging having integrated ornamental outer finishing.

BACKGROUND OF THE INVENTION

Gifts are traditionally presented wrapped in ornamental packaging. Typically, a gift may be enclosed within a box of sufficient rigidity to hold its shape against spontaneous slumping or collapse. The box may be enclosed within an ornamented thin, flexible wrapping. Ordinarily, the ornamental packaging is discarded after the gift is opened. This is unnecessarily wasteful of the box and its ornamented wrapping.

SUMMARY OF THE INVENTION

The present invention addresses the above stated situation by providing packaging which is both integrated with ornamented wrapping and also is reusable. To this end, the invention contemplates a generally rigid structural member which is sufficiently rigid as to hold its form, and which incorporates an outer ornamental wrapping. The generally rigid structural member is foldable, and therefore may be refolded after removing the contents, and stored for subsequent reuse. The ornamental wrapping is precut to the same perimetric shape as the generally rigid structural member when both are spread flat. The ornamental wrapping covers both interior and exterior surfaces of the structural member. The ornamental wrapping presents, with the packaging fully assembled, the appearance of a gift box conventionally wrapped with an ornamental web.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
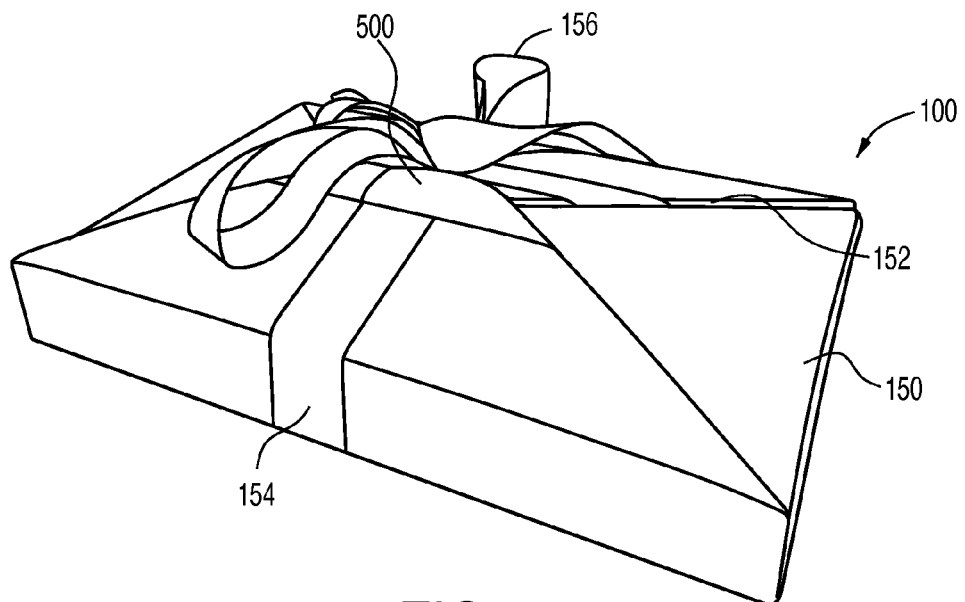
FIG. 1 is a perspective view of reusable ornamental packaging, shown erected as for enclosing a gift.
Figure 2:
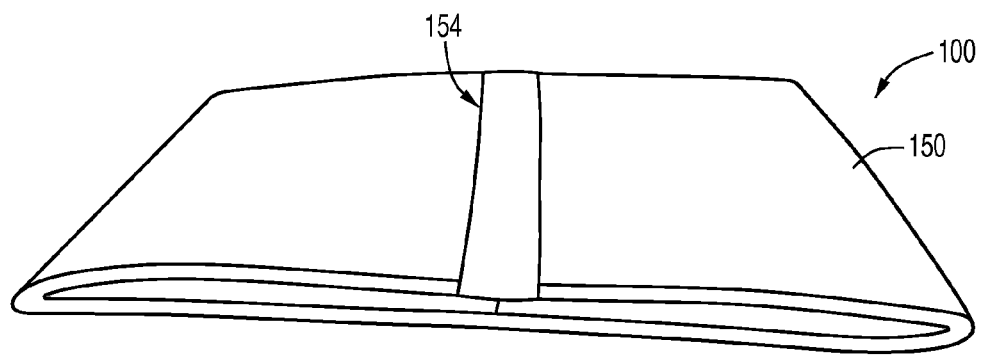
FIG. 2 shows the reusable ornamental packaging of FIG. 1, shown collapsed for storage.

Referring first to FIG. 1, according to at least one aspect of the invention, there is shown ornamental packaging 100 for enclosing and decorating a gift (not shown). In FIG. 1, the ornamental packaging 100 is shown erect in an assembled condition suitable for enclosing the gift. In FIG. 2, the ornamental packaging 100 is shown in a compact folded condition suitable for storage when not in use.

Figure 3:
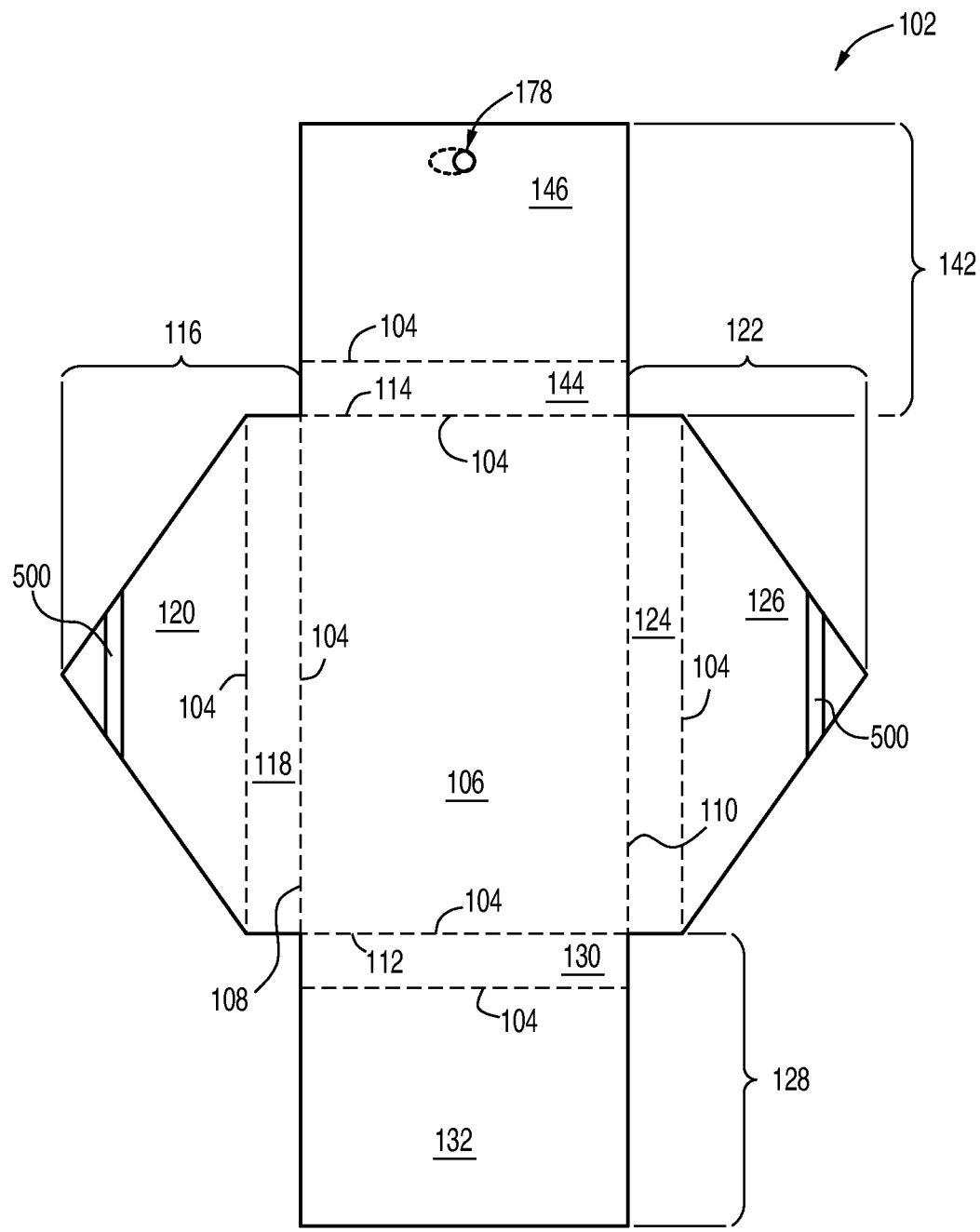
FIG. 3 is a plan view of a structural member of the ornamental packaging.

FIG. 3 shows a foldable structural member 102 which is foldable into a cuboid typical of gift boxes. As used herein, the term "cuboid" is meant in its geometric sense, that is, a three dimensional object having six rectangular faces at right angles to one other. The foldable structural member 102 is sufficiently rigid to hold the shape of the cuboid against spontaneous slumping and collapse due to gravity. To this end, the foldable structural member 102 may be fabricated from polymeric material such as original or recycled plastics or other suitable resins, corrugated paper or relatively stiff cardboard. When plastic or resin is used to form the structural member 102, their water resistant characteristics would allow them to be cleaned after use. When spread out flat as seen in FIG. 3, the planar foldable structural member 102 has fold lines 104 formed therein which subdivide the planar foldable structural member 102 into a number of joined constituent panels. The constituent panels include a rectangular central panel 106 having opposed first and second relatively long edges 108, 110 (coincident with two of the fold lines 104) and opposed first and second short edges 112, 114 (also coincident with fold lines 104).

A first tab 116 projects from the first relatively long edge 108 of the rectangular central panel 106 at one of the fold lines 104. The first tab includes a first rectangular short wall 118 and a first triangular terminus or end 120 joined to the rectangular short wall 118 at another one of the fold lines 104. A second tab 122 project2 from the second relatively long edge 110 of the rectangular central panel 106 at yet another one of the fold lines 104. The second tab 122 includes a second rectangular short wall 124 and a second triangular terminus or end 126 joined to the second rectangular short wall 124 at still another one of the fold lines 104. The second tab 122 is opposed to the first tab 116, in the example of FIG. 3 the second tab 122 being a mirror image of the first tab 116.

A first end tab 128 projects from the first short edge 112 at another one of the fold lines 104. The first end tab 128 includes a third rectangular short wall 130 and a first cover panel 132 joined to the third rectangular short wall 130 at another one of the fold lines 140. A second end tab 142 projects from the second short edge 114. The second end tab 142 includes a fourth rectangular short wall 144 and a second cover panel 146. The second end tab 142 is opposed to the first end tab 128, in the example of FIG. 3 the second end tab 142 being a mirror image of the first end tab 128.

As seen in FIG. 1, a thin, flexible ornamental wrapping 150 is attachable to the foldable structural member 102 in a manner covering the interior surface and the exterior surface of the foldable structural member 102 in close cooperation therewith. The interior surface is that surface which faces the interior of the cuboid formed when the foldable structural member 102 is in the assembled condition shown in FIG. 1.

Similarly, the exterior surface is that which faces the exterior of the cuboid formed when the foldable structural member 102 is in the assembled condition.

The thin, flexible ornamental wrapping 150 may be fabricated from a fabric. Because the ornamental packaging 100 is intended for reuse, it is preferable to utilize a web which is more durable than traditional ornamental paper wrappings, which the ornamental packaging 100 replaces in the present invention. The thin, flexible ornamental wrapping 150 is precut to simulate conventional wrapping which presents acute fold lines when applied over a cuboid, and may have folds 152, and a ribbon 154 and a bow 156 coupled thereto, for example.

Further, as a non-limiting example, the invention may have loops of ribbon or fabric 500 at the triangular top sides 122. This allows the ribbon 154 to be threaded through the loops 500 to make the final closure of the invention 100. The loops 500 may allow for other items to be used for the closure of the invention 100 with other items. As a non-limiting example, the other items may be pins, clips, or other smaller bows.

Figure 4:
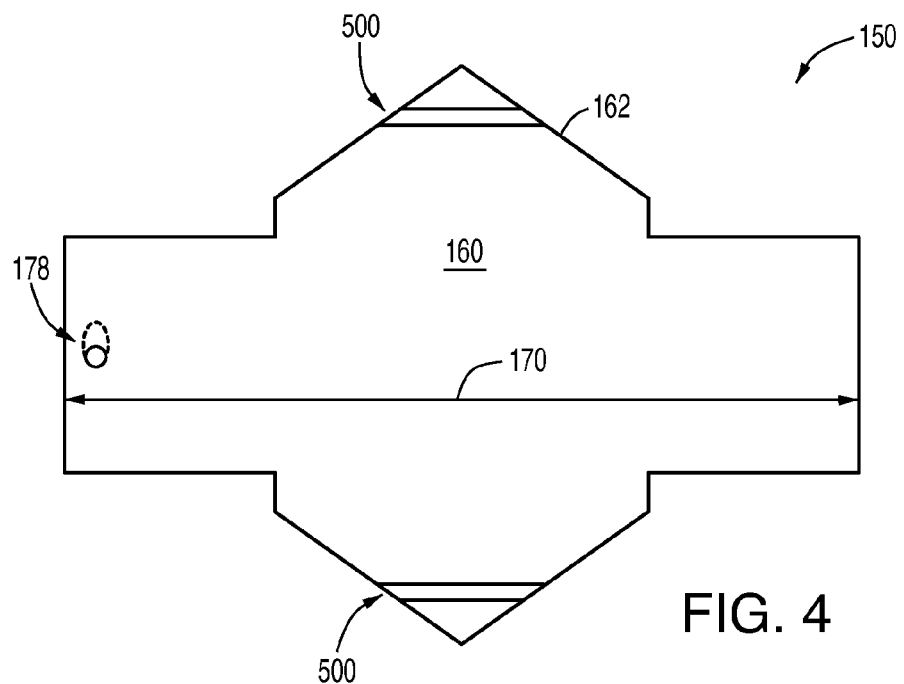
FIG. 4 is a plan view of an outer layer of ornamental wrapping used with the ornamental packaging of FIG. 1.
Figure 5:
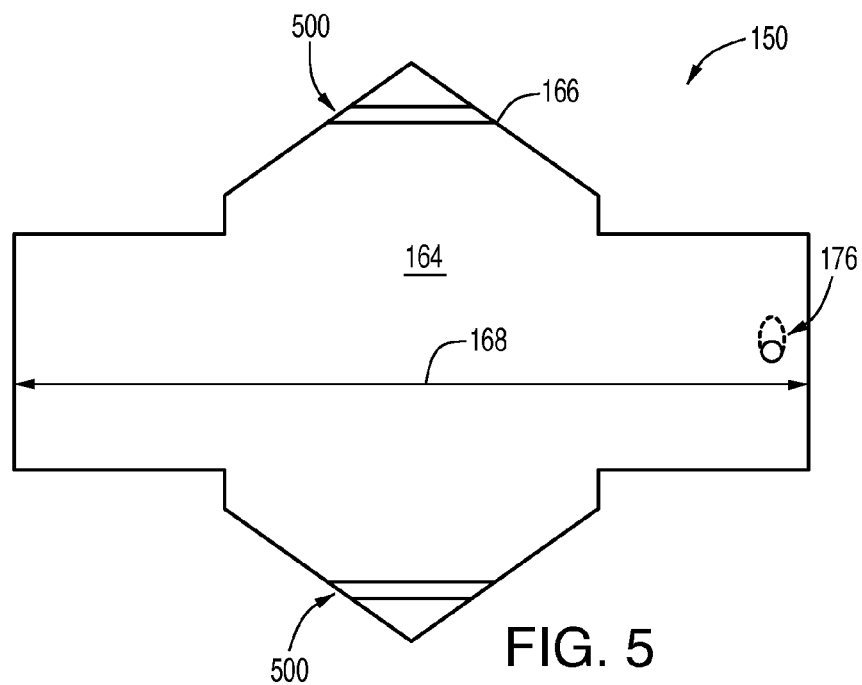
FIG. 5 is a plan view of an inner layer of ornamental wrapping used with the ornamental packaging of FIG. 1.
Figure 6:
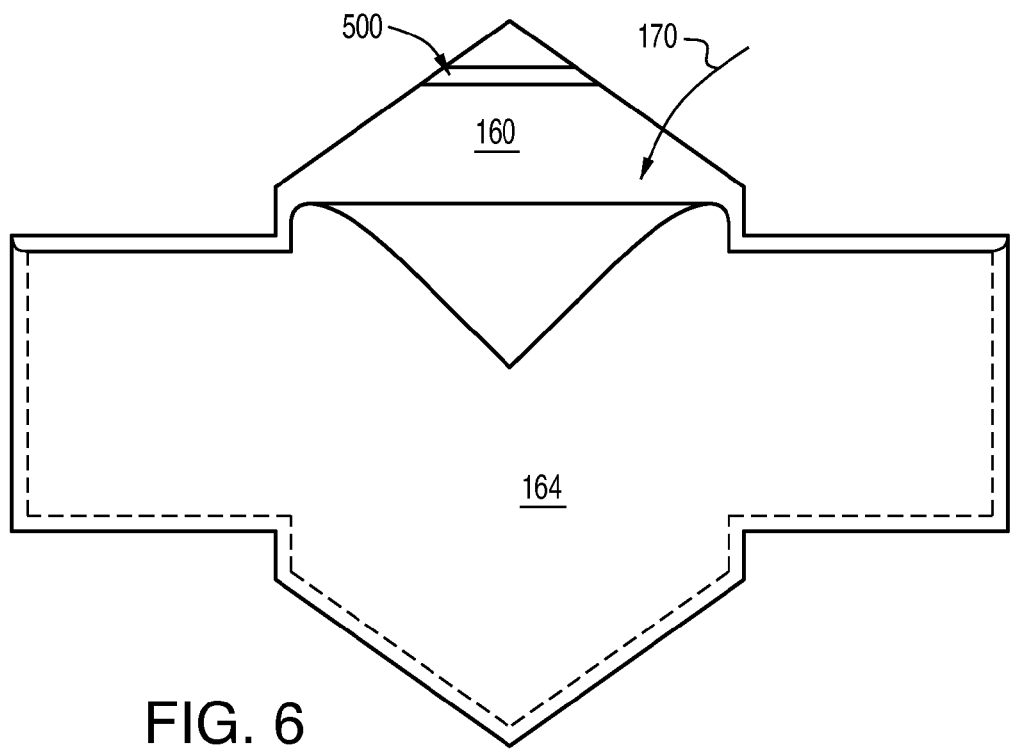
FIG. 6 is a plan view of the inner layer of FIG. 5 superimposed over the outer layer of FIG. 4.

Turning to FIGS. 4 and 5, the ornamental wrapping 150 may comprise an outer layer 160 (FIG. 4) having a periphery 162 similar to that of the foldable structural member 102, and an inner layer 164 (FIG. 5) having a periphery 166 similar to that of the foldable structural member 102. The outer and inner layers 160, 164 are differentiated in that the inner layer 164 may have dimensions (represented by a length 168) which is less in magnitude than the dimensions (represented by a length 170). The outer layer 160 is joined to the inner layer 164 along a portion of their respective peripheries 162, 166 to form an envelope open along a portion thereof, as seen in FIG. 6. The outer and inner layers 160, 164, which are similar in configuration to that of the foldable structural member 102, as well as being larger, may be stitched together (stitching is indicated in dashed lines in FIG. 6), for example, to form the envelope shown. This enables the foldable structural member 102 to be received in close cooperation when inserted into the envelope, which is open at those edges of the inner and outer layers 160, 164 which face upwardly in FIG. 6. Insertion of the foldable structural member 102 is represented by an arrow 170.

Figure 10:
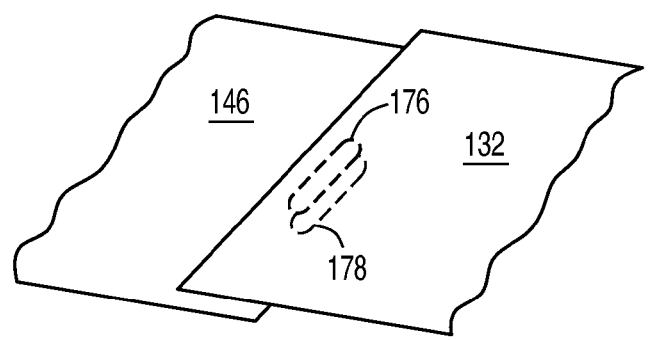
FIG. 10 is an enlarged perspective detail view of the center of FIG. 7.
Figure 7:
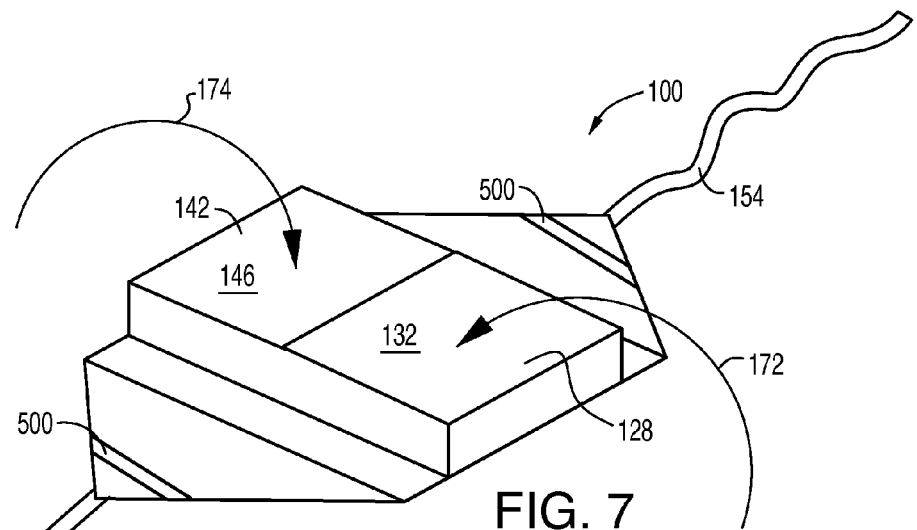
FIG. 7 depicts an initial stage of folding the structural member from the flat configuration shown in FIG. 3.
Figure 8:
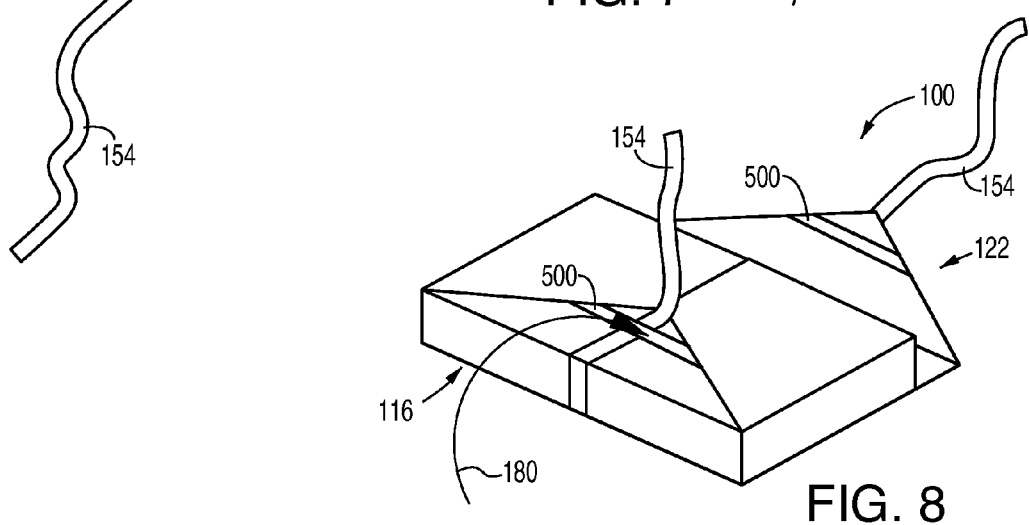
FIG. 8 is a subsequent stage of folding the structural member from the configuration illustrated in FIG. 7.
Figure 9:
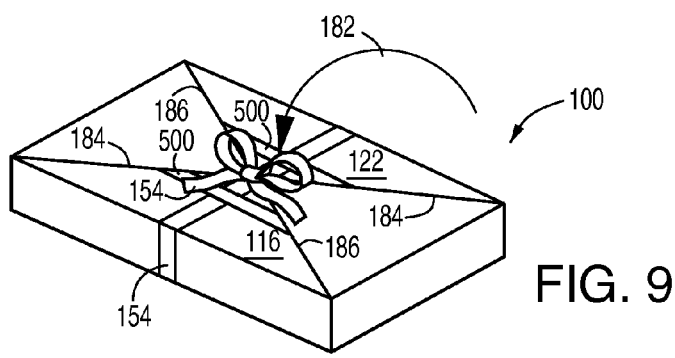
FIG. 9 is a final stage of folding the structural member shown in FIGS. 7 and 8.

FIGS. 7-9 illustrate folding of the ornamental packaging 100 into the assembled condition. This may be performed with the foldable structural member 102 inserted into and covered by the envelope formed by the united outer and inner layers 160, 164. Starting from the flat, spread condition shown in FIG. 3, the first and second end tabs 128, 142 are folded as indicated by arrows 172, 174 in FIG. 7. The first and second cover panels 132, 146 are sufficiently long as to overlap one another when the planar foldable structural member 102 is folded into the cuboid. Referring also to FIG. 10, the first and second cover panels 132, 146 may include respective magnetically acting latch members 176, 178 which magnetically engage one another when the first and second cover panels 132, 146 overlie and abut one another when the ornamental packaging is being assembled to form the cuboid. The magnetically acting latch members are configured to releasably maintain the ornamental packaging 100 in the configuration of the cuboid, and may be readily separated to fold the ornamental packaging 100 in the flat condition seen in FIG. 2. Either one or both of the magnetically acting latch members 176, 178 is a magnet. If not a magnet, one of the magnetically acting latch members 176, 178 is fabricated from a magnetically responsive material, such as steel.

Referring to FIG. 8, after the 132, 146 have been folded as seen in FIG. 7, the first tab 116 is folded (represented by an arrow 180). FIG. 9 shows indicating folding of the second tab 122 (arrow 182). This final folding will cause diagonal seams 184, 186 to be presented, thereby establishing the visual effect of traditional gift wrapping.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. Ornamental packaging for enclosing and decorating a gift, comprising:
   a one-piece foldable structural member having an interior surface and an exterior surface, wherein the foldable structural member is foldable into a cuboid with the interior surface facing the interior of the cuboid and the exterior surface facing the exterior of the cuboid, and is sufficiently rigid to hold the shape of the cuboid against spontaneous slumping and collapse due to gravity; and
   a one-piece thin, flexible ornamental wrapping being in close cooperation with both interior and exterior surfaces of the foldable structural member, wherein the entire exterior and interior surfaces of the foldable structural member are covered by the flexible ornamental wrapping; and
   the thin ornamental wrapping has an outer layer having the periphery similar to that of the foldable structural member and an inner layer having a periphery similar to that of the foldable structural member.

2. The ornamental packaging of claim 1, wherein the thin, flexible ornamental wrapping is precut to simulate conventional wrapping which presents acute fold lines when applied over a cuboid.

3. The ornamental packaging of claim 2, further comprising a ribbon coupled to the thin, flexible ornamental wrapping.

4. The ornamental packaging of claim 1, wherein the foldable structural member is configured in an unfolded condition a rectangle having opposed first and second relatively long edges and opposed first and second short edges, a first tab projecting from the first relatively long edge, and an opposed second tab projecting from the second relatively long edge, the first tab and the second tab having respective triangular ends.

5. The ornamental packaging of claim 1, wherein the outer layer is joined to the inner layer along a portion of the peripheries of the outer and inner layers.

6. The ornamental packaging of claim 4, further comprising respective magnetically acting latch members which magnetically engage one another when the first and second cover panels overlie and abut one another when the ornamental packaging is assembled as a cuboid, the magnetically acting latch members configured to releasably maintain the ornamental packaging in the configuration of the cuboid.

7. A planar one-piece foldable structural member having an interior and exterior surface, which can be folded into a cuboid, having fold lines formed therein which subdivide the planar foldable structural member into
   a rectangular central panel having opposed first and second relatively long edges and opposed first and second short edges;
   a first tab projecting from the first relatively long edge of the rectangular central panel at one of the fold lines, the first tab including a first rectangular short wall and a first triangular terminus joined to the rectangular short wall at another one of the fold lines;

a second tab projecting from the second relatively long edge of the rectangular central panel at yet another one of the fold lines, the second tab including a second rectangular short wall and a second triangular terminus joined to the second rectangular short wall at still another one of the fold lines, the second tab opposed to the first tab;

a first end tab projecting from the first short edge at another one of the fold lines, the first end tab including a third rectangular short wall and a first cover panel joined to the third rectangular short wall at another one of the fold lines;

a second end tab projecting from the second short edge, the second end tab including a fourth rectangular short wall and a second first cover panel, the second end tab opposed to the first end tab; and a one-piece thin, flexible ornamental wrapping being in close cooperation with both exterior and interior surfaces of the foldable structural member, wherein the entire exterior and interior surfaces of the foldable structural member are covered by the flexible ornamental wrapping; and the thin ornamental wrapping has an outer layer having the periphery similar to that of the foldable structural member and an inner layer having a periphery similar to that of the foldable structural member.

8. The planar one-piece structural folding member of claim 7, wherein the first and second cover panels are sufficiently long as to overlap one another when the planar foldable structural member is folded into the cuboid.

9. The planar one-piece structural folding member of claim 8, wherein the first and second cover panels include respective magnetically acting latch members which magnetically engage one another when the first and second cover panels overlie and abut one another.

10. The ornamental packaging of claim 4, wherein a retaining mechanism is located on each of the respective triangular ends in order to secure the ribbon in place.

11. The planar one-piece structural folding member of claim 7, wherein a retaining mechanism is located on each of the respective triangular ends in order to secure the ribbon in place.

12. The ornamental packaging of claim 1, wherein the thin, flexible ornamental wrapping is fabric.

13. The planar one-piece structural folding member of claim 7, wherein the thin, flexible ornamental wrapping is fabric.

* * * * *